United States Patent
Katsaros et al.

(10) Patent No.: US 10,659,317 B2
(45) Date of Patent: May 19, 2020

(54) DYNAMICALLY ADAPTING CLOUD APPLICATIONS

(71) Applicant: Intel Corporation, Santa Clara, CA (US)

(72) Inventors: Grigorios Katsaros, London (GB); Alexander Leckey, Kilcock (IE); Joseph Butler, Stamullen (IE); Connor Upton, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 15/087,218

(22) Filed: Mar. 31, 2016

(65) Prior Publication Data

US 2017/0288982 A1    Oct. 5, 2017

(51) Int. Cl.
*H04L 12/24* (2006.01)
*H04L 29/08* (2006.01)

(52) U.S. Cl.
CPC ...... *H04L 41/5038* (2013.01); *H04L 41/5025* (2013.01); *H04L 67/02* (2013.01); *H04L 67/10* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 8,209,218 B1* | 6/2012 | Basu | ............... | G06Q 10/0637 |
| | | | | 705/7.39 |
| 8,738,425 B1* | 5/2014 | Basu | ............... | G06Q 10/06393 |
| | | | | 705/7.38 |
| 9,521,052 B1* | 12/2016 | Nandyalam | ............. | H04L 43/08 |
| 9,591,316 B2* | 3/2017 | Bar Bracha | ............ | H04N 19/154 |

(Continued)

FOREIGN PATENT DOCUMENTS

WO    WO-2017172182 A1    10/2017

OTHER PUBLICATIONS

Gregory Katsaro, et al., SLAaaS:an OCCI Compliant Framework for Cloud SLA Provisioning and Violation Detection, 2016, In proceedings of the 6th International Conference on Cloud Computing and Services Sciences(CLOSER)—vol. 2, pp. 355-362. (Year: 2016).*

(Continued)

*Primary Examiner* — Backhean Tiv
(74) *Attorney, Agent, or Firm* — Schwegman Lundberg & Woessner, P.A.

(57) ABSTRACT

Techniques for dynamically adapting cloud applications are described. A current value of a Key Performance Indicator (KPI) of an executing cloud service instance of a cloud application is detected. A determination is made as to whether the current value of the KPI is unacceptable (e.g., either it is outside of an acceptable range or is within an adaptation region). If the current value of the KPI is unacceptable, a first application programming interface (API) is invoked to request a cloud service instance monitor to adapt (Continued)

the cloud service instance to operate within an acceptable KPI range. If the cloud service instance monitor was unsuccessful, the unacceptable KPI is escalated to the cloud service monitor for the type of the cloud service instance. If the cloud service monitor is unsuccessful, the unacceptable KPI is escalated to the application monitor.

25 Claims, 10 Drawing Sheets

(56) References Cited

U.S. PATENT DOCUMENTS

| | | | | |
|---|---|---|---|---|
| 2005/0010456 A1* | 1/2005 | Chang | G06Q 10/063 | 705/7.38 |
| 2010/0082379 A1* | 4/2010 | Chan | G06Q 10/0639 | 705/7.38 |
| 2010/0114788 A1* | 5/2010 | White | G06Q 30/02 | 705/319 |
| 2010/0280861 A1* | 11/2010 | Rossen | G06Q 10/00 | 705/7.28 |
| 2012/0131172 A1* | 5/2012 | Falk | H04L 12/6418 | 709/224 |
| 2013/0182577 A1* | 7/2013 | Ivanyi | H04L 43/08 | 370/241 |
| 2013/0298183 A1* | 11/2013 | McGrath | G06F 9/455 | 726/1 |
| 2014/0126569 A1* | 5/2014 | Deich | H04M 11/04 | 370/352 |
| 2014/0136668 A1* | 5/2014 | Brunswig | G06F 9/5072 | 709/222 |
| 2014/0181306 A1* | 6/2014 | Kothamasu | G06F 9/5072 | 709/226 |
| 2014/0219118 A1* | 8/2014 | Middleton | G06Q 30/0261 | 370/252 |
| 2014/0337510 A1* | 11/2014 | Gesmann | H04L 41/5009 | 709/224 |
| 2015/0106813 A1* | 4/2015 | Mihalocivi | H04L 47/125 | 718/1 |
| 2015/0112915 A1* | 4/2015 | Michael | G06N 5/04 | 706/46 |
| 2015/0281004 A1* | 10/2015 | Kakadia | H04L 41/147 | 370/235 |
| 2016/0063424 A1* | 3/2016 | Zeng | G06F 16/24565 | 705/7.28 |
| 2016/0127539 A1* | 5/2016 | Sharma | H04L 45/22 | 379/112.09 |
| 2017/0109211 A1* | 4/2017 | Feng | G06F 9/5055 | |
| 2017/0288982 A1* | 10/2017 | Katsaros | H04L 41/5038 | |

OTHER PUBLICATIONS

"International Application Serial No. PCT/US2017/019928, International Search Report dated Jun. 14, 2017", 3 pgs.

"International Application Serial No. PCT/US2017/019928, Written Opinion dated Jun. 14, 2017", 7 pgs.

"International Application Serial No. PCT/US2017/019928, International Preliminary Report on Patentability dated Oct. 11, 2018", 9 pgs.

* cited by examiner

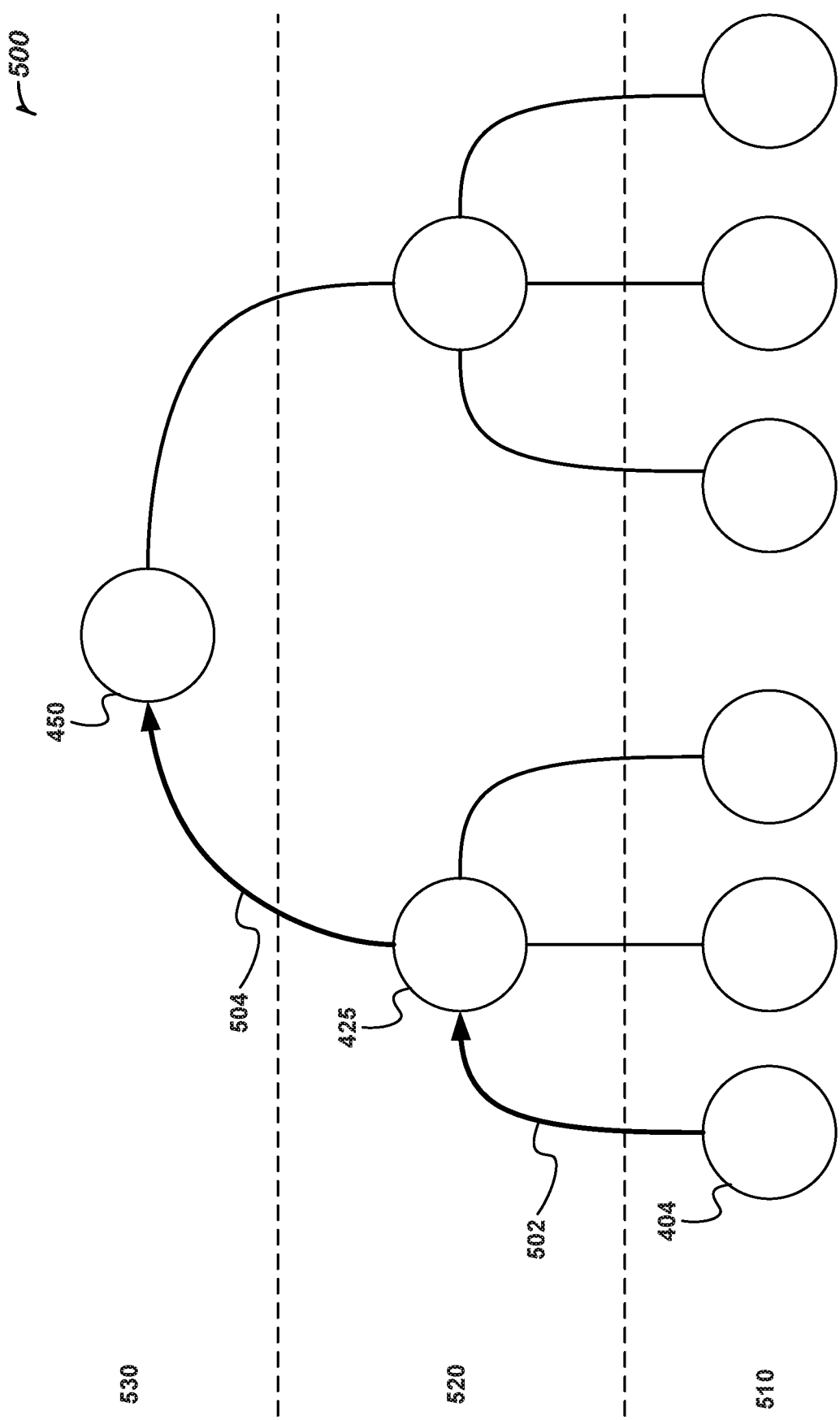

DYNAMICALLY ADAPTING CLOUD APPLICATIONS

TECHNICAL FIELD

The present disclosure relates generally to cloud computing, and specifically to dynamically adapting cloud applications.

BACKGROUND

Current Platform as a Service ("PaaS") providers do not have scalable insight into the Service Level Agreements ("SLAs") that Software as a Service ("SaaS") applications running on a PaaS provider's infrastructure provide to the users of the SaaS applications, thus making it difficult for a PaaS provider to understand the impact of infrastructure changes on the SaaS applications. On the other hand, SaaS application providers have little, if any, capability to combine information from the SaaS application with metric data from the PaaS infrastructure to dynamically adapt the SaaS application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

FIG. 5 illustrates an "event bubbling" mechanism of a dynamically adapting cloud application, according to an embodiment.

DETAILED DESCRIPTION

Figure 1:
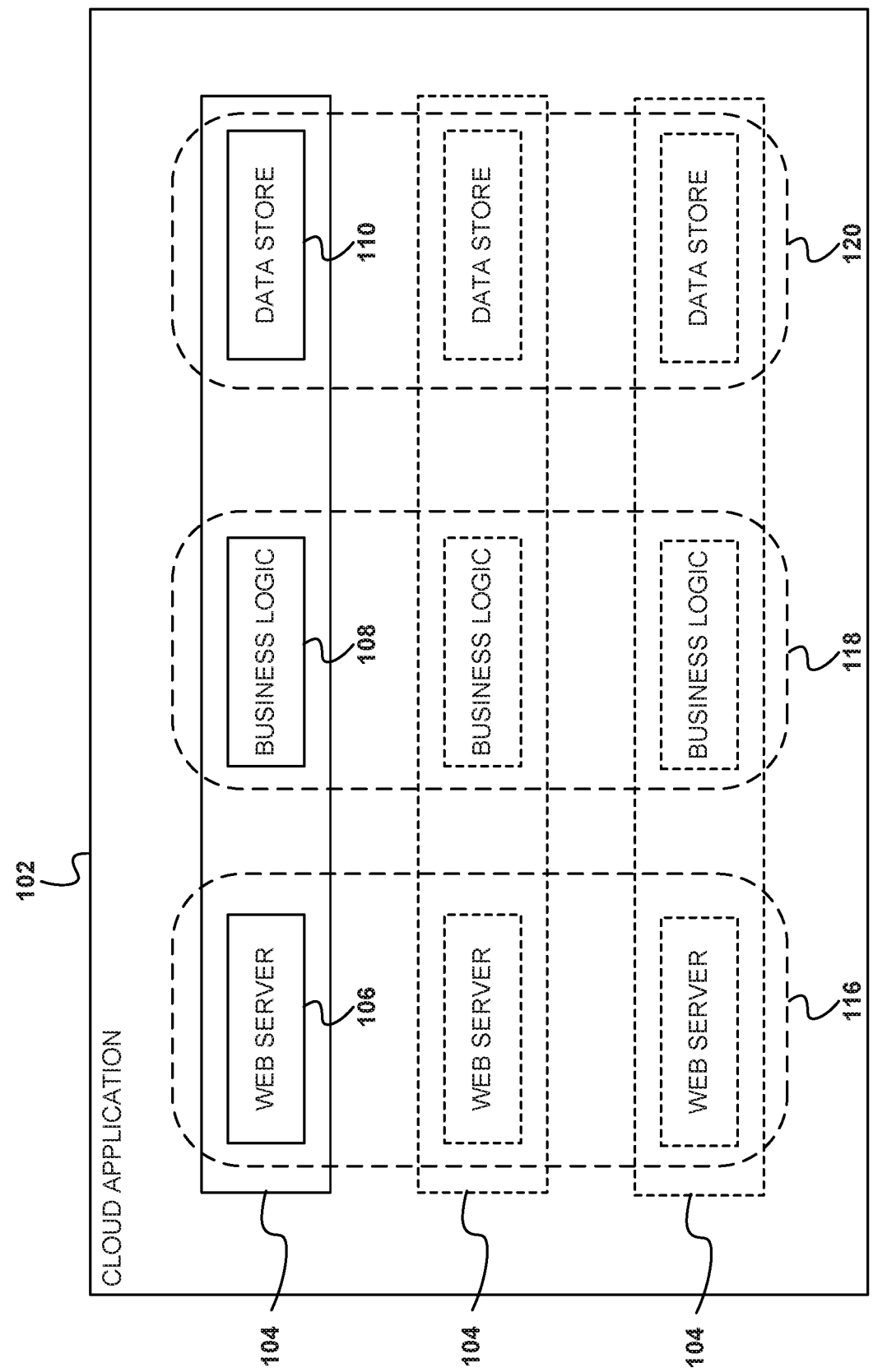
FIG. 1 illustrates a typical cloud application, according to an embodiment.

The present disclosure describes methods, systems, and computer program products that individually facilitate dynamically adapting cloud applications. In the following detailed description, for purposes of explanation, numerous specific details are set forth in order to provide a thorough understanding of the various aspects of the presently disclosed subject matter. However, it will be evident to those skilled in the art, after reading and understanding the present subject matter, that the presently disclosed subject matter may be practiced without these specific details. In other instances, well-known methods, procedures, and components have not been described in detail so as not to obscure the presently disclosed subject matter.

Current solutions for dynamic optimization of cloud resources within a cloud infrastructure are usually based on third-party applications, which monitor the SaaS' KPIs and signal a human when a SLA is close to being breached or has been breached. Third-party applications usually have little insight into how a SaaS application actually preforms and have difficulty differentiating the importance of the various services of a SaaS application. The disclosed embodiments allow SaaS developers to define their own SLA policies in various levels of granularity. Exposing the SLA, KPIs, and near real-time monitoring information, may allow better matching of software and hardware, including hardware features, and may reduce over-allocation of cloud hosting costs. In addition, by having a more dynamic service and cloud infrastructure, a SaaS application may dynamically adapt itself to support and assure the SaaS application's SLAs. The introduction of automated application adaptation through PaaS utilities may facilitate the SLA assurance of SaaS applications.

Glossary

"Cloud Computing"—In this disclosure, "cloud computing," also known as "on-demand computing" or simply "the cloud," is a kind of Internet-based computing that provides shared processing, storage, and communication resources to computers and other devices on demand.

"Cloud Application"—In this disclosure, a "cloud application" (sometimes called a "cloud app") is an application program in which the software and associated data are centrally hosted in the cloud, retaining some of the characteristics of a native desktop application and some characteristics of a pure web application. Cloud applications are composite applications that may be decomposed into a set of smaller components or "services." To avoid confusion, in this disclosure, the phrase "cloud application" refers to the entire application, and "cloud service" refers to one of the "cloud application's" composite, smaller components.

"Key Performance Indicator" or "KPI"—In this disclosure, a Key Performance Indicator of a cloud application is a measurable parameter that represents the effectiveness and performance of the cloud application under variable operational conditions and workload.

"Application Programming Interface" or "API"—In this disclosure, an "API" describes a set of routines, protocols, and tools for building software applications. A well-designed API makes it easier to develop a program by providing most (or all) of the building blocks. A programmer uses the building blocks to construct the application. Most operating environments (e.g., operating systems and cloud computing platforms) provide an API to let programmers write applications that are consistent with the operating environment.

"Cloud Consumer"—In this disclosure, a "cloud consumer" is a person or organization that engages with a cloud provider (e.g., Infrastructure as a Service (IaaS) or PaaS), either by means of a cloud broker or by means of a direct engagement with the cloud provider, to receive cloud services.

"Infrastructure as a Service" or "IaaS"—In this disclosure, an "IaaS" is a capability provided to the cloud consumer to provision processing, storage, networks, and other fundamental computing resources where the cloud consumer is able to deploy and run arbitrary software, which may include operating systems and applications. The cloud consumer does not manage or control the underlying cloud infrastructure, but has control over operating systems, storage, and deployed applications. Control is sometimes granted over select networking components (e.g., host firewalls).

"Platform as a Service" or "PaaS"—In this disclosure, a "PaaS" is a capability provided to the cloud consumer to deploy onto the cloud infrastructure consumer-created or acquired applications created using programming languages, libraries, services, and tools supported by the PaaS provider. The cloud consumer does not manage or control the underlying cloud infrastructure, including networks, servers, operating systems, or storage, but has control over the deployed applications and possibly configuration settings for the application hosting environment.

"Software as a Service" or "SaaS"—In this disclosure, a "SaaS" is a capability provided to the cloud application provider, using the PaaS provider's applications running on a cloud infrastructure. The cloud applications are accessible from various client devices through either a thin client interface, such as a web browser (e.g., web-based email), or a program interface. The cloud application provider does not manage or control the underlying cloud infrastructure, including network, servers, operating systems, storage, or even individual application capabilities, with the possible exception of limited user-specific application configuration settings.

"Microservice"—In this disclosure, a "microservice" is a cloud service with a single function. Following the "microservices" design pattern, a monolithic service is functionally decomposed into fine-grained microservices, each with a single function. For example, rather than a single message store service in an email messaging system that provides API methods for creating, reading, updating, or deleting messages, these functions may be decomposed into individual services. For instance, the read message feature may be provided by a service that only supports reading messages. The microservices approach has several advantages, including elasticity, performance, reliability, and ease of deployment. Elasticity is improved with microservices because each microservice type may scale independently of the others. For instance, if requests to read messages far outweigh requests to write messages, additional read microservices may be instantiated to handle the read requests. With a monolithic message store service, the whole service may need to be replicated, scaling unnecessarily and wasting resources.

FIG. 1 illustrates a typical cloud application 102, according to an embodiment. The cloud application 102 is composed of one or more cloud application instances 104. Each cloud application instance 104 is composed of one or more cloud services, each of which may be a microservice. For example, a cloud application 102 built on a three-tier model (e.g., a front end providing a user interface, a middle layer providing custom business logic, and a back end providing data storage and retrieval) may include three cloud services: a web server 106, a business logic layer 108, and a data store 110. For example, in a cloud application 102 built using "LAMP" (Linux, Apache, MySQL, and PHP) the web server 106 may be an Apache web server with a Linux operating system, the business logic layer 118 may be custom application code written in PHP, and the data store 120 may be a MySQL database. A cloud application instance 104 is the result of each of these cloud services 106, 108, 110 working together, and a cloud application 102 is the result of each cloud service type 116, 118, 120 working together. Each of these cloud services 106, 108, 110 may execute either on the same machine or on multiple machines; a machine may be a physical machine or a virtual machine. Furthermore, within the cloud application 102, each of the one or more cloud application instances 104 may execute concurrently. The quantity of cloud application instances 104 within the cloud application 102 may vary.

Figure 2:
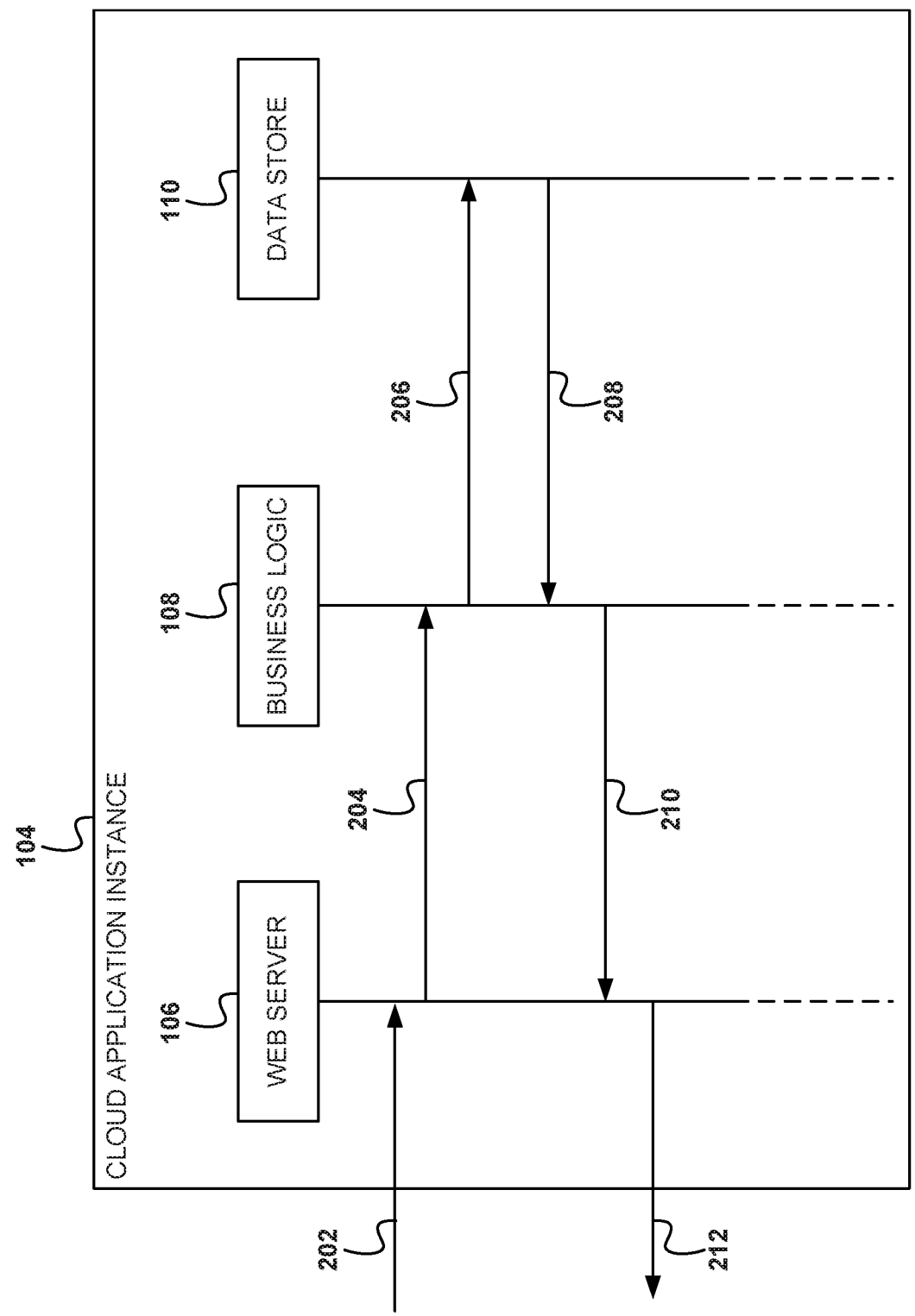
FIG. 2 illustrates latency within an instance of a cloud application, according to an embodiment.

FIG. 2 illustrates latency within an instance 104 of a cloud application 102, according to an embodiment. In a cloud application instance 104 illustrated in FIG. 1, the overall performance and quality of service ("QoS") of the cloud application instance 104 depends on the performance of its cloud services 106, 108, 110. As illustrated in FIG. 2, the latency for the cloud application instance 104 illustrated in FIG. 1 to respond to an external request 202 is the sum of the response times for each of the cloud services 106, 108, 110 to respond 208, 210, 212 to its corresponding request 202, 204, 206. Further complicating the situation is the fact that the cloud services 106, 108, 110 of a cloud application instance 104 may reside in different resources, data centers, or even different cloud providers.

Figure 3:
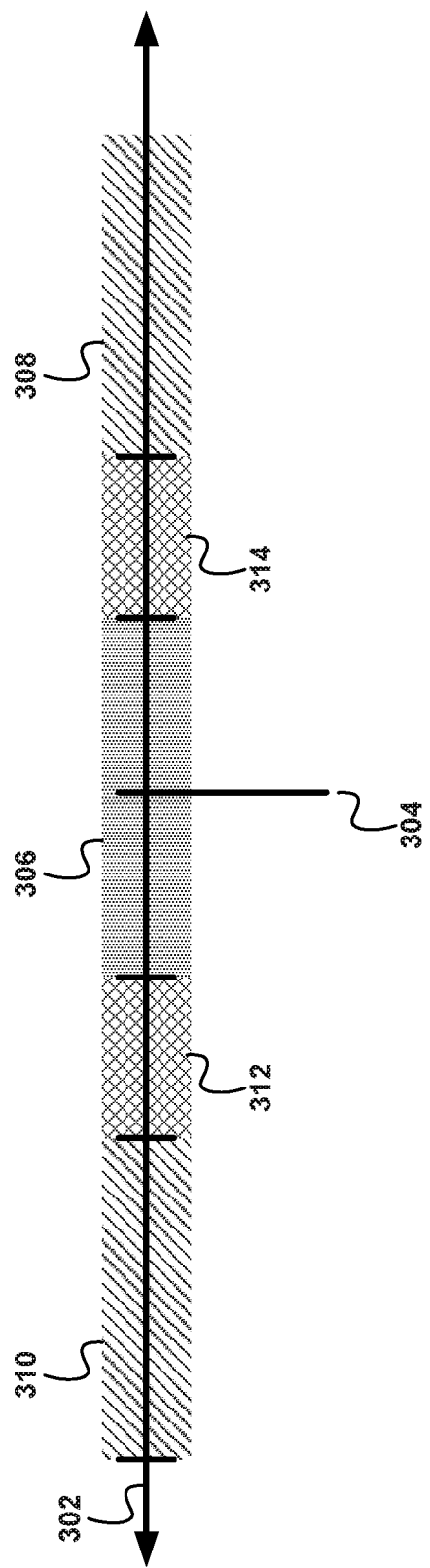
FIG. 3 illustrates an SLA Key Performance Indicator (KPI) and adaptation regions around the SLA, according to an embodiment.

FIG. 3 illustrates an SLA KPI and adaptation regions 312, 314 around the SLA, according to an embodiment. A Key Performance Indicator (KPI) of a cloud application 102 is a measurable parameter 302 that represents one aspect of the cloud application's 102 effectiveness and performance under variable operational conditions and workload. A drop of a KPI value may indicate performance degradation of the cloud application 102 or even a SLA violation. A SLA may specify the values the KPIs should report when the cloud application 102 is running as expected. Given an unlimited amount of cloud computing resources, a cloud application 102 may vastly outperform its SLA, however, this may also result in an increase in the service runtime costs for the additional compute resources required. A typical SLA provides a single target value 304 for each KPI that the cloud application 102 should seek to maintain. A more pragmatic approach may be to provide an acceptable performance range 306 in which the cloud application 102 should operate. By using this approach, both underperformance 308 and overperformance 310 may be expressed and identified.

The SLA to which the cloud application 102 should comply may be translated into a series of smaller SLAs ("sub-SLA"), each sub-SLA relating to a cloud service 106, 108, 110 of a cloud application instance 104. Thus, the cloud application 102 SLA may be decomposed and mapped to each of the cloud services 106, 108, 110 that comprise a cloud application instance 104. Each sub-SLA may be managed independently; thus the service and the defined KPIs may be assured for each cloud service 106, 108, 110 of the cloud application instance 104 as well as for the overall SLA for the cloud application 102.

In a cloud computing environment, it is possible to vary the number of compute resources available to a cloud application 102. To do this and still ensure that the cloud application stays within its acceptable performance range 306, two regions, referred to as "Adaption Regions," 312, 314 may be defined. When the cloud application's 102 performance moves into one of these regions 312, 314, the cloud application 102 may take steps to adjust the compute resources available and maintain the cloud application's 102 KPIs within the acceptable range 306.

To offer automated application or infrastructure adaption, the defined KPIs should be measurable, the source(s) of misbehavior should be determinable, and the Acceptable Range 306 and Adaption Regions 312, 314 should be defined. The deployed cloud application 102 should include a mechanism for extracting this information, a mechanism for assessing this information, and a mechanism for injecting an adaptation request. Furthermore, an automated adaptation framework for dynamically adapting cloud applications 102 should include the following features:

Understanding KPI Results

An executing cloud application 102 may have QoS variations and outliers. In that context, a weighting function (e.g., averaging) may be applied to the collected metrics. This weighting function and the frequency at which it is applied should be defined by the cloud application developer as they may change with the purposes of the cloud application.

Adaption Location

The adaption can be performed at various locations throughout the cloud application 102. These locations and the order in which adaptions may be performed are as follows:

1. Individual Service Monitor: On an individual (virtual) machine running an instance of a cloud service 106, 108, or 110.

2. Complete Service Instance Monitor: Across multiple (virtual) machines all running instances of the same cloud service 106, 108, or 110.

3. Application Monitor: Across the entire cloud application 102; multiple (virtual) machines running different cloud services 106, 108, 110 on each (virtual) machine.

A developer of a cloud application 102 may specify the adaption processes for each of these locations and be presented with the relevant performance data.

Providing Application Visibility to the Infrastructure (PaaS/IaaS) Provider

By exposing information about the cloud application 102 to the infrastructure components, the provider of the cloud application 102 allows the Infrastructure Provider to understand how the performance of a hosted cloud application 102 is impacted by changes to the underlying infrastructure. This allows the Infrastructure Provider hosting the cloud application 102 to scale down any over-provisioning, and also allows the Infrastructure Provider to understand how infrastructure changes (e.g., taking one or more machines out of service) may impact the applications of the Infrastructure Provider's customers. Such information should be shared on a per application basis, via a set of APIs available to the Infrastructure Provider.

Figure 4A:
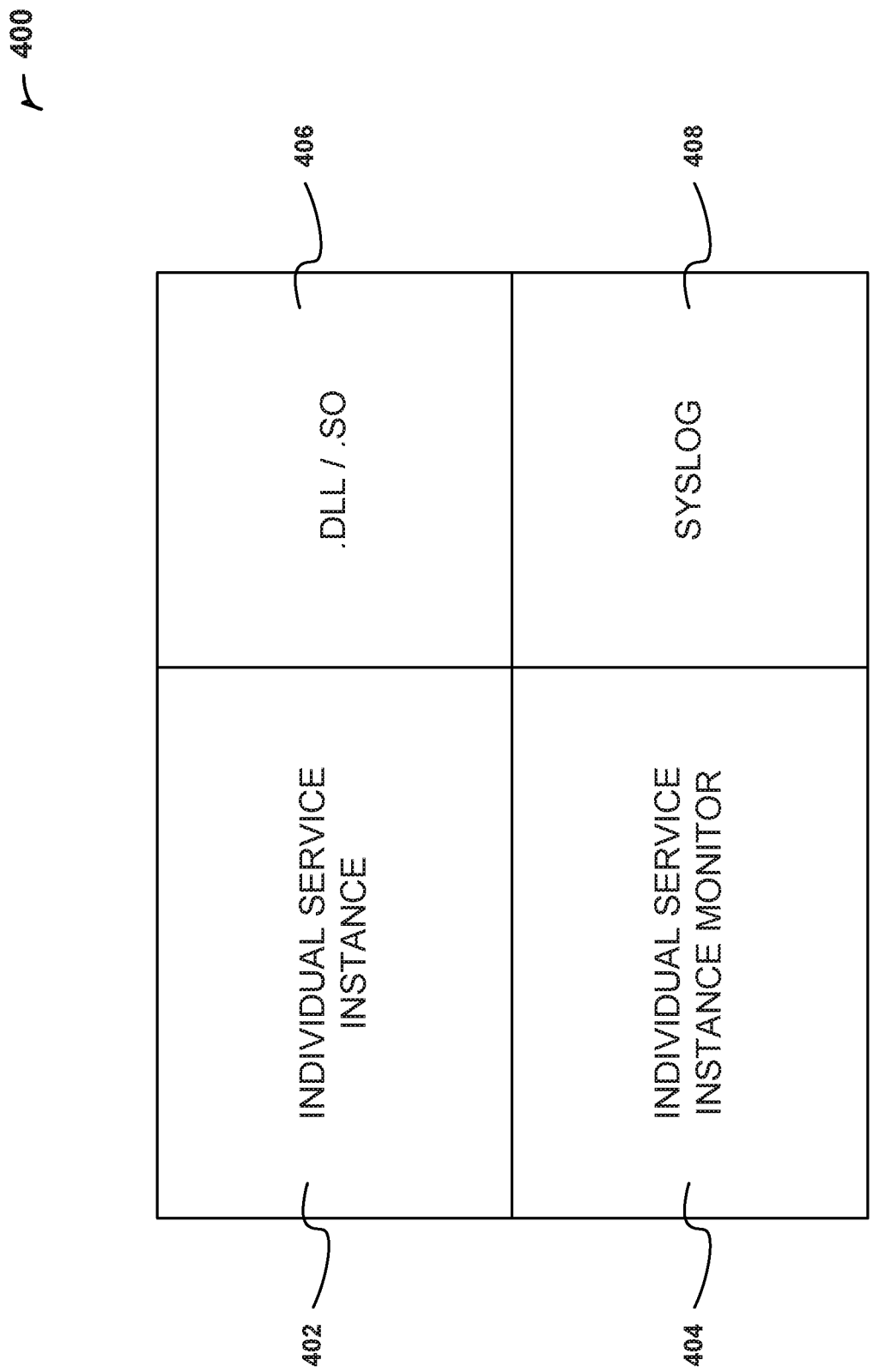
FIG. 4A illustrates a deployed service within a dynamically adapting cloud application, according to an embodiment.

FIG. 4A illustrates a deployed service 400 within a dynamically adapting cloud application 102, according to an embodiment. The deployed service 400 includes an individual service instance 402, which is an instance of a cloud service (e.g., web server 106, business logic layer 108, or data store 110). The deployed service 400 may execute in a (virtual) machine within the cloud platform.

The deployed service 400 may include a Syslog message bus 408, which may serve as the communication interface between the (virtual) machine and the cloud infrastructure/platform by sending messages to and receiving messages from the cloud infrastructure/platform.

The deployed service 400 may include a .DLL/.SO component 406. The .DLL/.SO component 406 provides performance monitoring functionality, including the ability to monitor both asynchronous and synchronous function calls. The .DLL/.SO component 406 also provides the ability to trace a single request throughout each of the services that comprise the cloud application. This .DLL/.SO component 406 produces Syslog entries. In addition, this .DLL/.SO component 406 provides cloud application 102 developers with the ability to define "call back functions," which are functions that are invoked asynchronously when an executing cloud application 102 reaches an adaption region 312, 314. A cloud application 102 developer may specify one or more call back functions for each of the adaption region 312, 314.

The deployed service 400 may include an Individual Service Instance Monitor 404. An Individual Service Instance Monitor 404 executes on each (virtual) machine used in the cloud application 102. An Individual Service Instance Monitor 404 processes the Syslog data and invokes the call back function for each adaption region 312, 314. An Individual Service Instance Monitor 404 also generates additional Syslog entries representing the behavior of the individual service instance 402. An Individual Service Instance Monitor 404 is responsible for collecting the local machine's syslog data and transmitting it to the Complete Service Instance Monitor (see FIG. 4B). This component is also responsible for marking the gathered logs with a (virtual) machine specific identifier. The PaaS/IaaS Provider may map this identifier back to a specific virtual machine executing on a specific physical machine (or group of machines). The scope of the adaption available at this location is limited to what is possible on a single instance (e.g., adding an additional thread, requesting additional CPU cores/RAM, etc.).

Figure 4B:
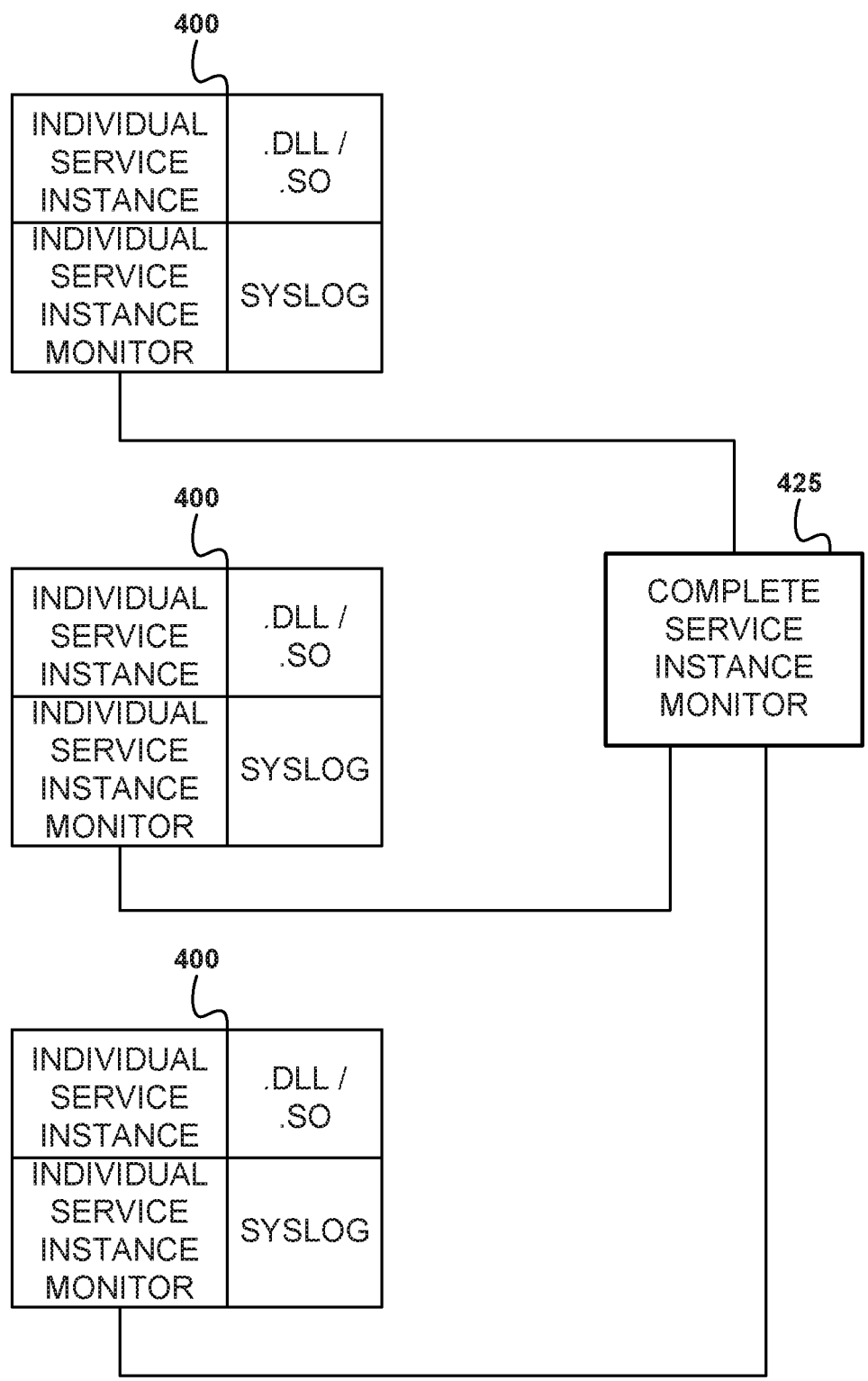
FIG. 4B illustrates a relationship between one or more deployed services and a Complete Service Instance Monitor, according to an embodiment.

FIG. 4B illustrates a relationship between one or more deployed services 400 and a Complete Service Instance Monitor 425, according to an embodiment. A Complete Service Instance Monitor 425 may be responsible for monitoring the behavior of each of the (virtual) machines executing a deployed service 400 whose individual service instance 402 is of a particular cloud service type (e.g., 116, 118, or 120). A Complete Service Instance Monitor 425 may receive the Syslog data from an Individual Service Instance Monitor 404 and may invoke the developer-specified call back function for an adaption region 312, 314. A Complete Service Instance Monitor 425 may also generate additional Syslog entries, which may include its own behavior or summarized statistics. A Complete Service Instance Monitor 425 may also dynamically configure one, some, or all instances corresponding to the cloud service type of the Complete Service Instance Monitor 425.

Figure 4C:
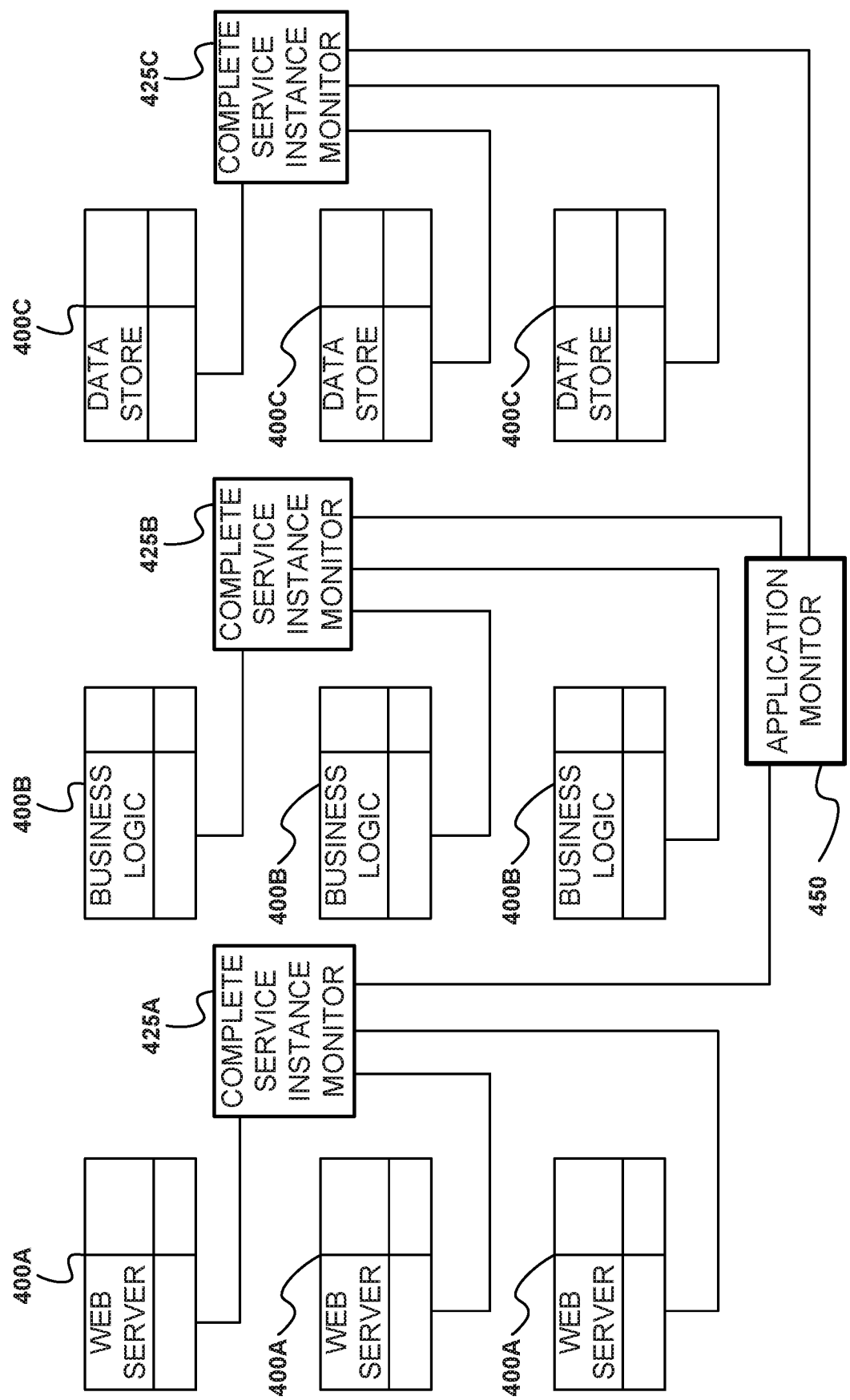
FIG. 4C illustrates a high-level architecture of an adaptation framework for dynamically adapting cloud applications deployed on a three-tier cloud application, according to an embodiment.

A Complete Service Instance Monitor 425 may also collect and forward Syslog data to the Application Monitor (see FIG. 4C). A goal of a Complete Service Instance Monitor 425 is to assure the SLA of its corresponding cloud service type (e.g., 116, 118, or 120). The scope of the adaption available at a Complete Service Instance Monitor 425 includes the ability to add or remove additional virtual machines to the set already executing the cloud service type (e.g., 116, 118, or 120).

FIG. 4C illustrates a high-level architecture of an adaptation framework for dynamically adapting cloud applications deployed on a three-tier cloud application, according to an embodiment. The Application Monitor 450 may be responsible for receiving the Syslog data from one or more Complete Service Instance Monitors 425A-C. The Application Monitor 450 may process this data to provide breakdowns (e.g., on the overall end-to-end time for a function's latency including breakdowns on each cloud service and how long a cloud service took to complete its work). This refers to the overall system SLA and the goal is to assure the overall SLA as is being decomposed into sub-SLAs. To this end, this Application Monitor 450 may also invoke the call back functions specified by the developer for an adaption region 312, 314. The scope of the adaption available at this location includes both significant application architecture and logic changes.

FIG. 5 illustrates an "event bubbling" mechanism 500 of a dynamically adapting cloud application 102, according to an embodiment. As described above, a developer of a cloud application 102 may specify one or more callback functions that should be triggered when a cloud service 106, 108, 110 enters an adaption region 312, 314. These callback functions may be invoked at one of the three levels of the cloud application 102 hierarchy: at the Individual Service Instance level 510, at the Complete Service Instance level 520, or at the Application level 530. To support this, the cloud application 102 may be designed to include an "event bubbling" mechanism 500, which may operate as follows. When a callback is first triggered by an Individual Service Monitor 404, the Individual Service Instance 402 is initially offered the opportunity to respond If the Individual Service Instance 402 does not successfully solve the condition(s) that caused the event, the callback "bubbles up" 502 to the Complete Service Instance Monitor 425 for the corresponding cloud service type (e.g., 116, 118, or 120). If the Complete Service Instance Monitor 425 does not successfully solve the condition(s) that caused the event, the callback is "bubbled up" 504 to the Application Monitor 450.

In an example embodiment, the cloud application 102 is a compute-intensive graphics rendering application. The cloud application 102 is parallelized to process calculations in multiple parallel nodes, each node being an Individual Service Instance 402 of the graphics rendering engine. A KPI of the cloud application 102 is the number of dropped frames per second ("FPS"); the SLA for the cloud application 102 is stated in terms of processed FPS. A value below 5 processed FPS for an Individual Service Instance 402 indicates the Individual Service Instance 402 is significantly underperforming and is endangering the performance of the whole cloud application 102. When an Individual Service Instance Monitor 404 detects its corresponding Individual Service Instance 402 (graphics rendering engine) has dropped below an acceptable QoS (e.g., processed FPS), the Individual Service Instance Monitor 404 invokes the relevant callback function, which is handled by the Individual Service Instance 402. The Individual Service Instance 402 attempts to address the drop in QoS internally, such as by changing settings within the graphics rendering engine. If the Individual Service Instance 402 fails to remedy the QoS problem, the Individual Service Instance 402 notifies (via the Individual Service Instance Monitor 404) the Complete Service Instance Monitor 425. The Complete Service Instance Monitor 425 assesses the situation with regard to the overall QoS of the cloud application 102 and takes appropriate corrective action(s). In some cases, such as when the QoS of the failing Individual Service Instance 402 is not adversely affecting the overall QoS of the cloud application 102, the appropriate corrective action may be to do nothing. In some cases, the corrective action(s) may be to invoke a callback function, migrate one or more Individual Service Instances 402 from one virtual machine to another, scale-up new Individual Service Instances 402, etc. A similar cascading API call occurs from the Complete Service Instance Monitor 425 to the Application Monitor 450 if the Complete Service Instance Monitor 425 fails to remedy the QoS problem.

This adaptation hierarchy creates a prioritization of reaction, in which the monitor(s) 404, 425, 450 closest to the event have an opportunity to respond before escalating the problem up the hierarchy. Solving a problem closest to the source of the problem may save time and/or resources for the cloud application 102. Similar callbacks and application adaptation scenarios may be cascaded down the adaptation hierarchy instead of up the adaptation hierarchy. For example, a KPI drop at the Complete Service Instance level 520 or the Application level 530 may be communicated down to the Individual Service Instances 402 through callbacks that each Individual Service Instance 402 uses to subscribe to its Complete Service Instance Monitor 425. In such a scenario, an Individual Service Instance 402 may thus be notified of a drop in QoS of the service and/or application, and may attempt to remedy the issue at the Individual Service Instance level 510.

The implementation of an automated adaptation framework may be based on existing or custom frameworks, components, and services of the cloud Infrastructure Provider in which the cloud application is to be deployed. The SLA definition and management of the cloud application SLAs and the individual cloud service SLAs may be specified using the Open Cloud Computing Interface (OCCI) SLAs specification, which allows SLAs to be represented in a standardized, machine-readable format. Using the OCCI SLAs specification, the cloud Infrastructure Provider may define machine-readable SLA templates for use by its cloud applications 102, expressing the individual sub-SLAs in a standardized manner. Each SLA may include the defined KPIs as Service Level Objectives metrics. The association of the SLAs with the resource instances and the hierarchy of SLAs between the services may be expressed with the OCCI AgreementLinks structure, which the OCCI SLAs API supports.

Figure 6:
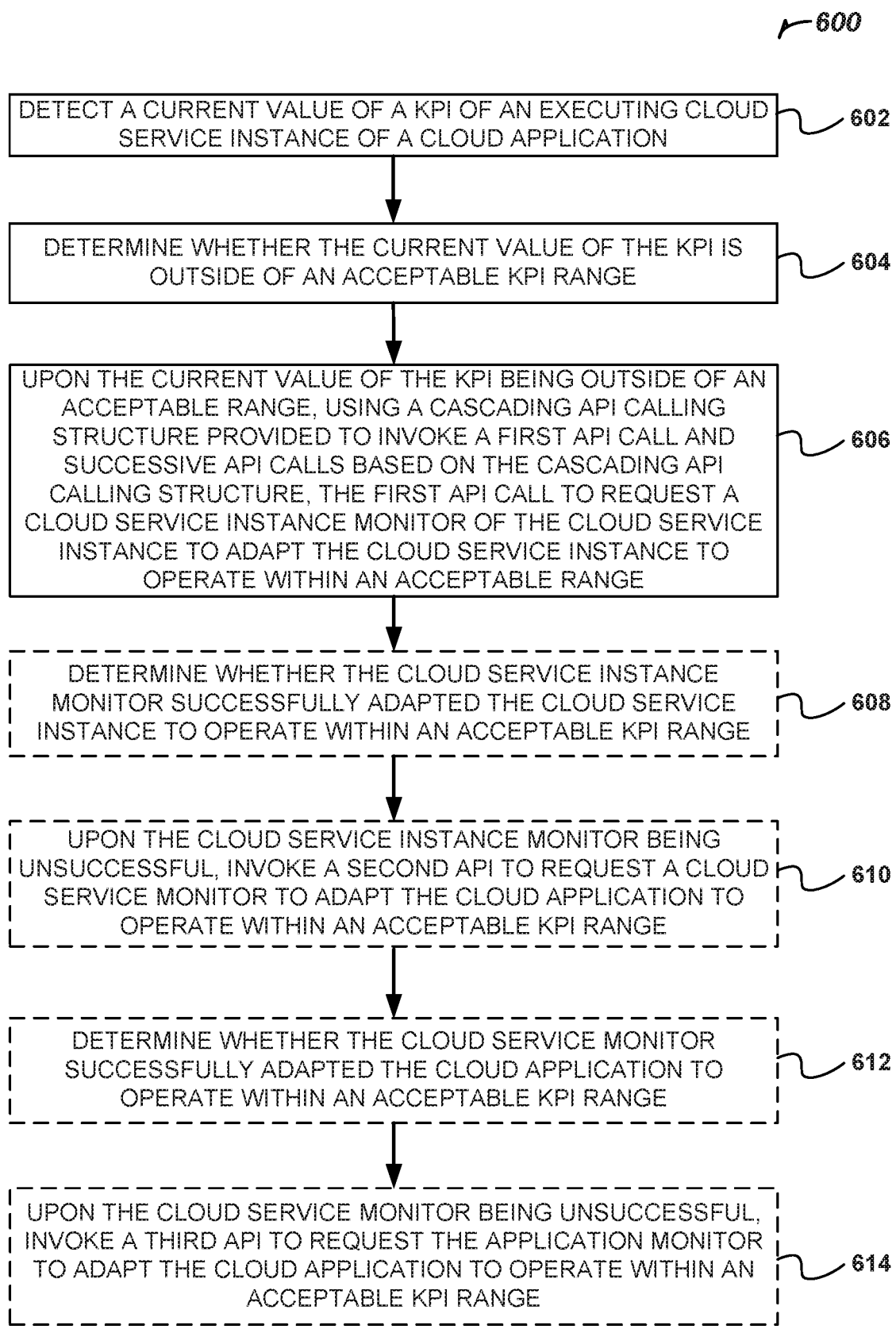
FIG. 6 is a flowchart illustrating operations of an event bubbling mechanism of a dynamically adapting cloud application, according to an embodiment.

FIG. 6 is a flowchart 600 illustrating operations of an event bubbling mechanism 500 of a dynamically adapting cloud application 102, according to an embodiment.

At operation 602, a current value of a KPI of an executing cloud service instance 402 of a cloud application 102 is detected.

At operation 604, a determination is made as to whether the current value of the KPI is outside of an acceptable KPI range 306. In an embodiment, the determination may be whether the current value of the KPI is within an adaptation region 312, 314.

At operation 606, upon the current value of the KPI being outside of an acceptable range 306 (or being within an adaptation region 312, 314), a first API is invoked to request a cloud service instance monitor 404 to adapt the cloud service instance 402 back into an acceptable KPI range 306.

At operation 608, optionally, a determination is made as to whether the cloud service instance monitor 404 successfully adapted the cloud service instance 402 back into an acceptable KPI range 306.

At operation 610, optionally, upon the cloud service instance monitor 404 being unsuccessful, a second API is invoked to request a cloud service monitor 425 to adapt the cloud application 102 back into an acceptable KPI range 306.

At operation 612, optionally, a determination is made as to whether the cloud service monitor 425 successfully adapted the cloud application 102 back into an acceptable KPI range 306.

At operation 614, optionally, upon the cloud service monitor 425 being unsuccessful, a third API is invoked to request an application monitor 450 to adapt the cloud application 102 back into an acceptable KPI range 306.

Figure 7:
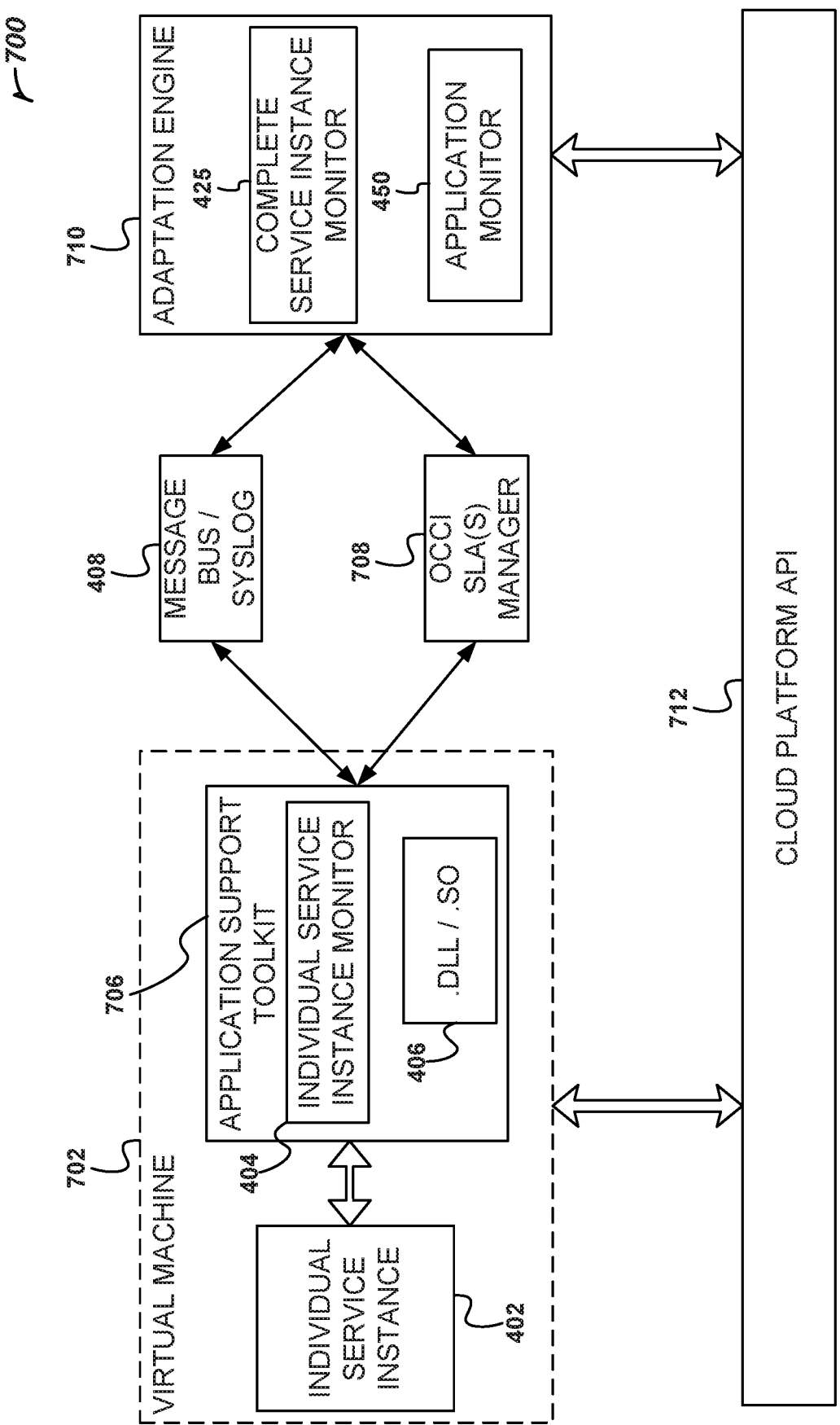
FIG. 7 illustrates an implementation architecture of an automated adaptation framework for dynamically adapting cloud applications, according to an embodiment, according to an embodiment.

FIG. 7 illustrates an implementation architecture 700 of an automated adaptation framework for dynamically adapting cloud applications 102, according to an embodiment. The .DLL/.SO component 406 and the Individual Service Instance Monitor 404 may be implemented as a packaged Application Support Toolkit 706. These custom components may reside inside each virtual machine 702 and, via the appropriate interfaces, enable the virtual machine 702 to interact with the OCCI SLA manager 708 and the Syslog message bus 408 (which serves as the communication interface between the virtual machine 702 and the cloud infrastructure/platform API 712). The Syslog message bus 408 may be implemented by the cloud infrastructure/platform API 712 using message queues, such as OpenStack's RabbitMQ, etc. An Adaptation Engine 710 may include a Complete Service Instance Monitor 425 and an Application Monitor 450. The components of a Complete Service Instance Monitor 425 and an Application Monitor 450 may be implemented as custom services of the cloud infrastructure/platform API 712. The PaaS Provider may offer the Application Support Toolkit 706 to its customers' cloud applications. A cloud application developer may use the Application Support Toolkit 706 to define policies that enable dynamic adaptations at the adaptation regions 312, 314 of an individual service instance 402. The Application Support Toolkit 706 may interact with the PaaS provider's APIs 712, as well as with the Syslog message bus 408 and the OCCI SLA manager 708, to acquire the information to execute the policy. The event bubbling may be implemented by populating the Syslog message bus 408 with appropriate events each time a respective monitor 404, 425, 450 is executing its internal policies.

Figure 8:
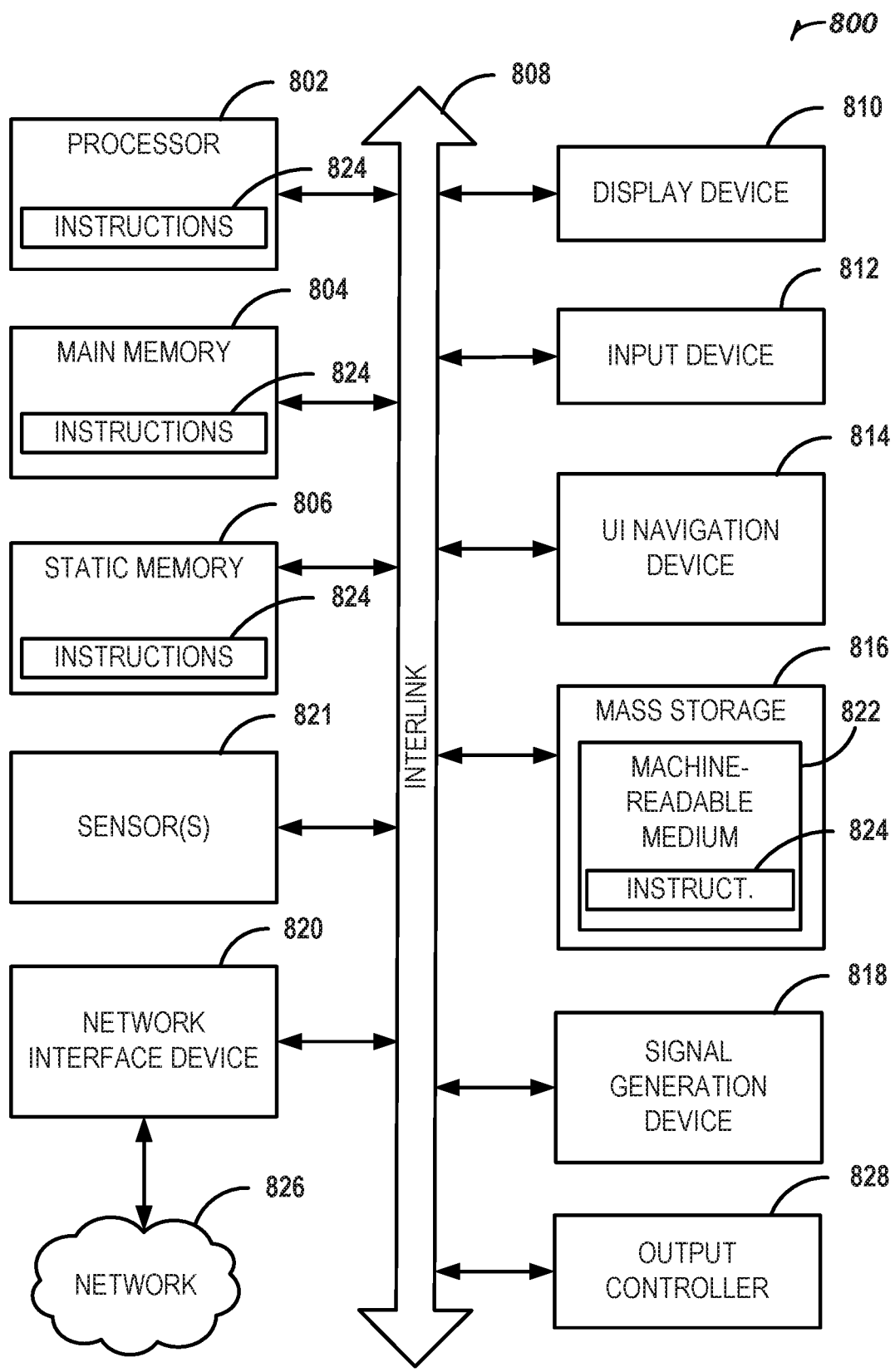
FIG. 8 is a block diagram illustrating an example of a machine, upon which any one or more embodiments may be implemented.

The components of the automated adaptation framework 700 (e.g., the virtual machine(s) 702, the adaptation engine(s) 710, etc.), may execute on hardware, such as one or more machines 800 illustrated in FIG. 8.

The .SO library may support the following functionality:
- Send enactment points—initiate an infrastructural or application related change by triggering the Complete Service Instance Monitor 425. See the event bubbling hierarchy).
- Receive adaption requests—subscribe to events that may come from the other levels in order to react to potential changes, including reacting to KPI changes or reacting to specific events coming from other monitors (e.g., the Application Monitor 450 'commands' all Individual Service Instances 402 to change certain features).
- Interfaces for sending metric/event information to the other levels of the event bubbling hierarchy.
- Perform local/remote logging (functional features for the operation of the framework/library).
- Provide APIs for instrumentation of the cloud application 102 to both the cloud application 102 and the PaaS provider. The instrumentation allows a developer of a cloud application 102 to: (a) adapt the cloud application 102 based on the values of the monitored KPIs, and (b) expose KPI levels to and request infrastructure changes from the underlying PaaS Provider. This enables low-level analysis of potential critical paths within an executing cloud application 102, which is mapped to virtual and physical servers in the PaaS's data center(s).
- Allow developers of cloud applications 102 to define and expose KPIs and SLAs in the cloud application code, rather than in a separate application.
- Allow tying SLAs and KPIs to blocks of code in a cloud application 102 and physical servers in the PaaS's data center(s).
- Expose KPIs, SLAs, and cloud applications' 102 architecture to the PaaS provider at run time, without additional pre-deployment documentation or additional metadata constructs.
- Provide a cloud application 102 with the ability to automatically and dynamically adapt/repair itself when a KPI is in danger of breaking an SLA.
- Provide the PaaS infrastructure with notifications regarding a cloud application's 102 performance.

FIG. 8 is a block diagram illustrating an example of a machine 800, upon which any one or more embodiments may be implemented. In alternative embodiments, the machine 800 may operate as a standalone device or may be connected (e.g., networked) to other machines. In a networked deployment, the machine 800 may operate in the capacity of a server machine, a client machine, or both in a client-server network environment. In an example, the machine 800 may act as a peer machine in a peer-to-peer (P2P) (or other distributed) network environment. The machine 800 may implement or include any portion of the systems, devices, or methods illustrated in FIGS. 1-7, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Although the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 800, and includes digital or analog communications signals or other intangible medium to facilitate communication of such software.

Additional Notes & Example Embodiments

Each of these non-limiting examples can stand on its own, or can be combined in various permutations or combinations with one or more of the other examples.

Example 1 is a system for dynamically adapting a cloud application, the system comprising: a key performance indicator (KPI) detector to detect a current value of a KPI of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type; a first KPI filter to determine whether the current value of the KPI is outside of an acceptable range; and a first KPI adaptor to use, upon a determination that the current value of the KPI is outside of an acceptable range, a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

In Example 2, the subject matter of Example 1 optionally includes a second KPI filter to determine whether the cloud service instance monitor successfully adapted the cloud service instance to operate within the acceptable range; and a second KPI adaptor to invoke, upon a determination that the cloud service instance monitor was not successful, a second API provided by the PaaS provider to request a cloud service monitor, corresponding to the service type of the cloud service instance, to adapt the cloud application to operate within the acceptable range.

In Example 3, the subject matter of Example 2 optionally includes a third KPI filter to determine whether the cloud service monitor successfully adapted the cloud application back into the acceptable range; and a third KPI adaptor to invoke, upon a determination that the cloud service monitor was not successful, a third API provided by the PaaS provider to request an application monitor for the cloud application to adapt the cloud application to operate within the acceptable range.

In Example 4, the subject matter of Example 3 optionally includes wherein at least one of the cloud service monitor and the application monitor is provided to the cloud application by the PaaS provider.

In Example 5, the subject matter of any one or more of Examples 1-4 optionally include wherein the SLA is represented in a machine-readable format.

In Example 6, the subject matter of Example 5 optionally includes wherein the machine-readable format conforms to the Open Cloud Computing Interface (OCCI) SLA specification.

In Example 7, the subject matter of any one or more of Examples 3-6 optionally include wherein the cloud service instance monitor is provided in an Application Support Toolkit (AST) by the PaaS provider.

In Example 8, the subject matter of Example 7 optionally includes wherein the AST includes a library of executable code, which when executed, causes the system to facilitate communication, via a fourth API provided by the PaaS provider, between the cloud service instance and a platform provided by the PaaS provider.

In Example 9, the subject matter of any one or more of Examples 1-8 optionally include wherein the cloud service instance and the cloud service instance monitor are to execute within a virtual machine of a platform provided by the PaaS provider.

In Example 10, the subject matter of Example 9 optionally includes wherein the adaption includes at least one of the cloud service monitor and the application monitor to initialize an additional virtual machine within the platform to execute a new cloud service instance.

In Example 11, the subject matter of any one or more of Examples 9-10 optionally include wherein the adaption includes at least one of the cloud service monitor and the application monitor to decommission a virtual machine within the platform; and wherein the cloud service instance, whose current KPI value is outside of the acceptable range, had executed within the virtual machine to be decommissioned.

In Example 12, the subject matter of any one or more of Examples 1-11 optionally include wherein to determine whether the current value of the KPI is outside of an acceptable range includes to determine whether the current value of the KPI is within a KPI adaptation range.

Example 13 is a method of dynamically adapting a cloud application, the method comprising: detecting a current value of a key performance indicator (KPI) of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type; determining whether the current value of the KPI is outside of an acceptable range; and upon determining the current value of the KPI is outside of an acceptable range, using a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

In Example 14, the subject matter of Example 13 optionally includes determining whether the cloud service instance monitor successfully adapted the cloud service instance to operate within the acceptable range; and upon determining the cloud service instance monitor was not successful, invoking a second API provided by the PaaS provider to request a cloud service monitor, corresponding to the service type of the cloud service instance, to adapt the cloud application to operate within the acceptable range.

In Example 15, the subject matter of Example 14 optionally includes determining whether the cloud service monitor successfully adapted the cloud application back into the acceptable range; and upon determining the cloud service monitor was not successful, invoking a third API provided by the PaaS provider to request an application monitor for the cloud application to adapt the cloud application to operate within the acceptable range.

In Example 16, the subject matter of Example 15 optionally includes wherein at least one of the cloud service monitor and the application monitor is provided to the cloud application by the PaaS provider.

In Example 17, the subject matter of any one or more of Examples 13-16 optionally include wherein the SLA is represented in a machine-readable format.

In Example 18, the subject matter of Example 17 optionally includes wherein the machine-readable format conforms to the Open Cloud Computing Interface (OCCI) SLA specification.

In Example 19, the subject matter of any one or more of Examples 15-18 optionally include wherein the cloud service instance monitor is provided in an Application Support Toolkit (AST) by the PaaS provider.

In Example 20, the subject matter of Example 19 optionally includes wherein the AST includes a library of executable code that when executed, facilitates via a fourth API provided by the PaaS provider, communication between the cloud service instance and a platform provided by the PaaS provider.

In Example 21, the subject matter of any one or more of Examples 13-20 optionally include wherein the cloud service instance and the cloud service instance monitor execute within a virtual machine of a platform provided by the PaaS provider.

In Example 22, the subject matter of Example 21 optionally includes wherein adapting includes at least one of the cloud service monitor and the application monitor initializing an additional virtual machine within the platform to execute a new cloud service instance.

In Example 23, the subject matter of any one or more of Examples 21-22 optionally include wherein adapting includes at least one of the cloud service monitor and the application monitor decommissioning a virtual machine within the platform, the virtual machine executing the cloud service instance whose current KPI value is outside of the acceptable range.

In Example 24, the subject matter of any one or more of Examples 13-23 optionally include wherein determining the current value of the KPI is outside of an acceptable range includes determining the current value of the KPI is within a KPI adaptation range.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for dynamically adapting a cloud application, the apparatus comprising: means for detecting a current value of a key performance indicator (KPI) of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type; means for determining whether the current value of the KPI is outside of an acceptable range; and means for using, upon determining the current value of the KPI is outside of an acceptable range, a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

In Example 28, the subject matter of Example 27 optionally includes means for determining whether the cloud service instance monitor successfully adapted the cloud service instance to operate within the acceptable range; and means for invoking, upon determining the cloud service instance monitor was not successful, a second API provided by the PaaS provider to request a cloud service monitor, corresponding to the service type of the cloud service instance, to adapt the cloud application to operate within the acceptable range.

In Example 29, the subject matter of Example 28 optionally includes means for determining whether the cloud service monitor successfully adapted the cloud application back into the acceptable range; and means for invoking, upon determining the cloud service monitor was not successful, a third API provided by the PaaS provider to request an application monitor for the cloud application to adapt the cloud application to operate within the acceptable range.

In Example 30, the subject matter of Example 29 optionally includes wherein at least one of the cloud service monitor and the application monitor is provided to the cloud application by the PaaS provider.

In Example 31, the subject matter of any one or more of Examples 27-30 optionally include wherein the SLA is represented in a machine-readable format.

In Example 32, the subject matter of Example 31 optionally includes wherein the machine-readable format conforms to the Open Cloud Computing Interface (OCCI) SLA specification.

In Example 33, the subject matter of any one or more of Examples 29-32 optionally include wherein the cloud service instance monitor is provided in an Application Support Toolkit (AST) by the PaaS provider.

In Example 34, the subject matter of Example 33 optionally includes wherein the AST includes a library of executable code that when executed, facilitates via a fourth API provided by the PaaS provider, communication between the cloud service instance and a platform provided by the PaaS provider.

In Example 35, the subject matter of any one or more of Examples 27-34 optionally include wherein the cloud service instance and the cloud service instance monitor execute within a virtual machine of a platform provided by the PaaS provider.

In Example 36, the subject matter of Example 35 optionally includes wherein adapting includes at least one of the cloud service monitor and the application monitor initializing an additional virtual machine within the platform to execute a new cloud service instance.

In Example 37, the subject matter of any one or more of Examples 35-36 optionally include wherein adapting includes at least one of the cloud service monitor and the application monitor decommissioning a virtual machine within the platform, the virtual machine executing the cloud service instance whose current KPI value is outside of the acceptable range.

In Example 38, the subject matter of any one or more of Examples 27-37 optionally include wherein determining the current value of the KPI is outside of an acceptable range includes determining the current value of the KPI is within a KPI adaptation range.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A system for dynamically adapting a cloud application, the system comprising:
    a processor and memory, configured with instructions to:
        detect, using a key performance indicator (KPI) detector, a current value of a KPI of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type, wherein the KPI and the SLA are tied to a block of code in the cloud application, and wherein the block of code is provided by the PaaS provider;
        determine, using a first KPI filter, whether the current value of the KPI is outside of an acceptable range, wherein the determination includes a determination of whether the current value of the KPI is within a KPI adaptation range; and use a first KPI adaptor to, upon a determination that the current value of the KPI is outside of an acceptable range and is within the KPI adaptation range, implement a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

2. The system of claim 1, further comprising:

determine, using a second KPI filter, whether the cloud service instance monitor successfully adapted the cloud service instance to operate within the acceptable range; and invoke, using a second KPI adaptor, upon a determination that the cloud service instance monitor was not successful, a second API provided by the PaaS provider to request a cloud service monitor, corresponding to the service type of the cloud service instance, to adapt the cloud application to operate within the acceptable range.

3. The system of claim 2, further comprising:

determine, using a third KPI filter, whether the cloud service monitor successfully adapted the cloud application back into the acceptable range; and invoke, using a third KPI adaptor, upon a determination that the cloud service monitor was not successful, a third API provided by the PaaS provider to request an application monitor for the cloud application to adapt the cloud application to operate within the acceptable range.

4. The system of claim 3, wherein at least one of the cloud service monitor and the application monitor is provided to the cloud application by the PaaS provider.

5. The system of claim 1, wherein the SLA is represented in a machine-readable format.

6. The system of claim 5, wherein the machine-readable format conforms to the Open Cloud Computing Interface (OCCI) SLA specification.

7. The system of claim 3, wherein the cloud service instance monitor and the block of code are provided in an Application Support Toolkit (AST) by the PaaS provider.

8. The system of claim 7, wherein the AST includes a library of executable code, which when executed, causes the system to facilitate communication, via a fourth API provided by the PaaS provider, between the cloud service instance and a platform provided by the PaaS provider.

9. The system of claim 1, wherein the cloud service instance and the cloud service instance monitor are to execute within a virtual machine of a platform provided by the PaaS provider.

10. The system of claim 9, wherein the adaption includes at least one of the cloud service monitor and the application monitor to initialize an additional virtual machine within the platform to execute a new cloud service instance.

11. The system of claim 9, wherein the adaption includes:

at least one of the cloud service monitor and the application monitor to decommission a virtual machine within the platform; and wherein the cloud service instance, whose current KPI value is outside of the acceptable range, had executed within the virtual machine to be decommissioned.

12. The system of claim 1, wherein in response to the current value of the KPI being within the KPI adaptation range, the cloud application adjusts a compute resource to move the KPI outside the adaptation range into the acceptable range.

13. A method of dynamically adapting a cloud application, the method comprising:

detecting a current value of a key performance indicator (KPI) of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type, wherein the KPI and the SLA are tied to a block of code in the cloud application, and wherein the block of code is provided by the PaaS provider;

determining whether the current value of the KPI is outside of an acceptable range, wherein the determination includes a determination of whether the current value of the KPI is within a KPI adaptation range; and upon determining the current value of the KPI is outside of an acceptable range and is within the KPI adaptation range, implementing a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

14. The method of claim 13, further comprising:

determining whether the cloud service instance monitor successfully adapted the cloud service instance to operate within the acceptable range; and upon determining the cloud service instance monitor was not successful, invoking a second API provided by the PaaS provider to request a cloud service monitor, corresponding to the service type of the cloud service instance, to adapt the cloud application to operate within the acceptable range.

15. The method of claim 14, further comprising:

determining whether the cloud service monitor successfully adapted the cloud application back into the acceptable range; and upon determining the cloud service monitor was not successful, invoking a third API provided by the PaaS provider to request an application monitor for the cloud application to adapt the cloud application to operate within the acceptable range.

16. At least one non-transitory machine-readable medium including instructions, which when executed by a machine, cause the machine to:

detect a current value of a key performance indicator (KPI) of an executing cloud service instance of a cloud application, the cloud application hosted by a Platform as a Service (PaaS) provider, the KPI corresponding to a service level agreement (SLA) between a provider of the cloud application and a user of the cloud application, the cloud service instance having a service type, wherein the KPI and the SLA are tied to a block of code in the cloud application, and wherein the block of code is provided by the PaaS provider;

determine whether the current value of the KPI is outside of an acceptable range, wherein the determination includes a determination of whether the current value of the KPI is within a KPI adaptation range; and upon a determination that the current value of the KPI is outside of an acceptable range and is within the KPI adaptation range, implement a cascading application programming interface (API) calling structure provided by the PaaS provider to invoke a first API call and successive API calls based on the cascading API calling structure, the first API call to request a cloud service instance monitor of the cloud service instance to adapt the cloud service instance to operate within the acceptable range.

17. The at least one non-transitory machine-readable medium of claim 16, wherein the instructions further cause the machine to:
determine whether the cloud service instance monitor successfully adapted the cloud service instance to operate within the acceptable range; and
upon a determination that the cloud service instance monitor was not successful, invoke a second API provided by the PaaS provider to request a cloud service monitor, corresponding to the service type of the cloud service instance, to adapt the cloud application to operate within the acceptable range.

18. The at least one non-transitory machine-readable medium of claim 17, wherein the instructions further cause the machine to:
determine whether the cloud service monitor successfully adapted the cloud application back into the acceptable range; and
upon a determination that the cloud service monitor was not successful, invoke a third API provided by the PaaS provider to request an application monitor for the cloud application to adapt the cloud application to operate within the acceptable range.

19. The at least one non-transitory machine-readable medium of claim 18, wherein at least one of the cloud service monitor and the application monitor is provided to the cloud application by the PaaS provider.

20. The at least one non-transitory machine-readable medium of claim 16, wherein the SLA is represented in a machine-readable format.

21. The at least one non-transitory machine-readable medium of claim 20, wherein the machine-readable format conforms to the Open Cloud Computing Interface (OCCI) SLA specification.

22. The at least one non-transitory machine-readable medium of claim 18, wherein the cloud service instance monitor and the block of code are provided in an Application Support Toolkit (AST) by the PaaS provider.

23. The at least one non-transitory machine-readable medium of claim 22, wherein the AST includes a library of executable code that when executed, causes the machine to facilitate communication, via a fourth API provided by the PaaS provider, between the cloud service instance and a platform provided by the PaaS provider.

24. The at least one non-transitory machine-readable medium of claim 16, wherein the cloud service instance and the cloud service instance monitor are to execute within a virtual machine of a platform provided by the PaaS provider.

25. The at least one non-transitory machine-readable medium of claim 24, wherein the adaption includes at least one of the cloud service monitor and the application monitor to initialize an additional virtual machine within the platform to execute a new cloud service instance.

* * * * *